United States Patent
Morenzin et al.

(10) Patent No.: US 7,055,758 B2
(45) Date of Patent: Jun. 6, 2006

(54) MARKING DEVICE, METHOD AND APPARATUS FOR THE PRODUCTION THEREOF AND A METHOD FOR READING A MARKING DEVICE OF THIS TYPE

(75) Inventors: Jan Morenzin, Hennef (DE); Daniel Schondelmaier, Titz-Rödingen (DE); Wolfgang Eberhardt, Jülich (DE)

(73) Assignee: Berliner Elektronenspeicherring-Gesellschaft fur Synchrotronstrahlung m.b.H., Berlin (DE)

(*) Notice: Subject to any disclaimer, the term of this patent is extended or adjusted under 35 U.S.C. 154(b) by 0 days.

(21) Appl. No.: 10/204,498

(22) PCT Filed: Jan. 10, 2001

(86) PCT No.: PCT/EP01/00247

§ 371 (c)(1),
(2), (4) Date: Sep. 26, 2002

(87) PCT Pub. No.: WO01/63554

PCT Pub. Date: Aug. 30, 2001

(65) Prior Publication Data

US 2003/0107832 A1 Jun. 12, 2003

(30) Foreign Application Priority Data

Feb. 22, 2000 (DE) .............................. 100 08 097

(51) Int. Cl.
*G06K 19/06* (2006.01)
(52) U.S. Cl. .................................................... 235/493
(58) Field of Classification Search ................ 235/449, 235/375, 380, 492, 487, 493; 365/157, 158, 365/171; 428/692, 694 ML
See application file for complete search history.

(56) References Cited

U.S. PATENT DOCUMENTS

| | | | |
|---|---|---|---|
| 2,988,466 A | 6/1961 | Melklejohn | |
| 3,735,728 A | 5/1973 | Krumme et al. | |
| 3,883,892 A | 5/1975 | Kneller et al. | |
| 4,203,544 A * | 5/1980 | Guilgue | 235/449 |
| 4,478,878 A | 10/1984 | Neuwald | |
| 4,650,978 A | 3/1987 | Hudson et al. | |
| 4,837,426 A | 6/1989 | Pease et al. | |
| 5,177,344 A | 1/1993 | Pease | |
| 5,254,843 A | 10/1993 | Hynes et al. | |
| 5,365,586 A | 11/1994 | Indeck et al. | |
| 5,448,515 A * | 9/1995 | Fukami et al. | 365/171 |
| 5,480,685 A | 1/1996 | Suzuki et al. | |
| 5,529,814 A * | 6/1996 | Tan et al. | 427/547 |
| 5,616,904 A | 4/1997 | Fernadez | |
| 5,821,859 A * | 10/1998 | Schrott et al. | 340/572.6 |
| 5,936,293 A * | 8/1999 | Parkin | 257/422 |
| 5,965,285 A * | 10/1999 | Mihara et al. | 428/694 ML |
| 5,972,438 A | 10/1999 | Suzuki et al. | |
| 6,480,411 B1 * | 11/2002 | Koganei | 365/158 |
| 6,609,663 B1 * | 8/2003 | Eberhardt et al. | 235/493 |

FOREIGN PATENT DOCUMENTS

| | | |
|---|---|---|
| DE | 24 05 623 | 1/1976 |
| DE | 695 02 259 | 1/1999 |
| DE | 197 35 603 | 11/1999 |
| EP | 0 031 060 | 7/1981 |
| WO | WO/00/30029 | 5/2000 |

* cited by examiner

*Primary Examiner*—Ahshik Kim
(74) *Attorney, Agent, or Firm*—Andrew Wilford

(57) ABSTRACT

A marking device for the identification of an object includes laterally offset regions formed directly on the object with different magnetic characteristics. The different regions can have histeresis loops shifted differently to one another.

13 Claims, 9 Drawing Sheets

MARKING DEVICE, METHOD AND APPARATUS FOR THE PRODUCTION THEREOF AND A METHOD FOR READING A MARKING DEVICE OF THIS TYPE

CROSS REFERENCE TO RELATED APPLICATIONS

This application is the a national stage of PCT/EP01/00247 filed 10 Jan. 2001 and based upon a German national application 100 08 097.9 filed 22 Feb. 2000 under the International Convention.

FIELD OF THE INVENTION

The invention relates to a marking device for the identification of objects, with a coding of regions with different magnetic characteristics. It relates further to a method and apparatus for making the marking device as well as to a method for reading such a marking device.

BACKGROUND OF THE INVENTION

For the marking and thus individual correlation and verification of check cards, credit cards, access cards, electronic keys or the like, a number of magnetic codings are used, and mainly in the form of a so-called magnetic strip. For the coding a permanent magnetic layer is selectively, i.e. regionally, so magnetized that regions of different magnetization result. In the sense of the present description nonmagnetized regions, i.e. regions of zero magnetization, are included as regions of different magnetization. With corresponding field sensors, the magnetic signature or coding can be determined and processing for the respective purpose can be carried out.

There are numerous proposals for the formation of magnetic strips. In U.S. Pat. No. 4,650,978, the naturally occurring random variations of the magnetic characteristics of the magnetic strip, having their origins in the variations in coercivity, granularity, layer thickness, surface contour and especially in random variations in the hysteresis loop and other magnetic histories determining same are used. Similar are the codings in the methods according to U.S. Pat. No. 5,616,904 and U.S. Pat. No. 4,837,826. The magnetic structure is thus digitized in a suitable form and used to identify the object. It is a drawback that the magnetic strips can be manipulated relatively simply and are not resistant to external magnetic fields.

In U.S. Pat. Nos. 5,480,658 and 5,972,438 magnetic strips are described in which magnetic particles are incorporated in a binder, whereby the magnetic strips each have two layers of different coercivities. Also the magnetic strips of U.S. Pat. No. 5,177,344 have magnetic particles in a binder matrix whereby the magnetic particles are so influenced by the application of an external magnetic field that they yield magnetic regions of different characteristics. These types of magnetic strips have the drawback that the magnetic structure can be subsequently altered by heating of the binder and by newly orienting the magnetic particles by an external magnetic field. In the magnetic strips of U.S. Pat. No. 5,365,586 a number of microcrystalline structures are arranged in a random grid. The magnetic strips are thus subjected to saturation magnetization, whereby the remanent noise is read out and used for identification. These magnetic strips as well are capable of being influenced by external manipulations.

In U.S. Pat. No. 5,254,843, conventionally written magnetic bands and strips have random variations in time sequence of flux changes which are used for identification of the respective object. Here as well the random structure, upon identification, can easily be reproduced. Aside from this, the method requires a randomness of the variations in time which, especially in the case of machine writing, cannot be taken for granted.

In the PCT/EP99/08433, which was not prepublished, a marking device is proposed in which the coding has a magnetic base layer and a magnetic coding layer which so cooperate that over the extent of the base layer and the coding layer, there are regions with nonparallel or antiparallel magnetic coupling. In this case use is made of the effect of magnetic interlayer coupling. The marking device has the advantage of a highly characteristic property distinguishing from the usual magnetic marking that upon the application of an external magnetic field while the nonparallel or antiparallel coupling is broken by the influence of a saturation magnetic field, the original magnetization is restored after the removal of the external magnetic field. The coding can thus not be extinguished by external magnetic fields. In addition the effect can be used, for example, in the case of magnetic codings which weaken and are even lost as a result of long storage time, to reactivate them by exposing them to a saturation magnetic field.

OBJECTS OF THE INVENTION

It is the object of the invention to provide a marking device of the type mentioned at the outset so that the coding is permanent, difficult to manipulate and insensitive to external influences. The marking device should, in addition, enable a verification test without data connection to an external computer. A further object is to provide a method and apparatus for producing such a marking device.

SUMMARY OF THE INVENTION

The first part of this object is achieved in that magnetic regions are so mechanically biased that their hysteresis loops are shifted along the field strength axis with respect to the symmetrical course to the magnetization axis. The influencing of such a magnetic bias, after the completion of manufacture can only take place by application of high field strengths with simultaneous heating above critical Néel temperature. Thus high security against manipulation is ensured. Inadvertent alteration or erasure of the stored data is not possible. By selection of suitable antiferromagnetic materials, the critical Néel temperature can be so high that a manipulation without destruction of the stored information or of the total system is practically not possible.

By contrast, the invention opens the possibility of testing of marking devices by combined local reading of the remanent distribution of the magnetization and the distribution of the saturation magnetization. Thus a reliable distinction can be made as to whether one is dealing with the original structure or with a simulation of the magnetic structure. The verification test can be effected mechanically and can be read out without control by a person. An external data connection for verification is not required. As a result, the reading device can be economical and compact, being fabricated using conventional magnetic reading technology.

Basically it is possible that regions of magnetic bias can be spaced apart. Then the intervening regions can be unmagnetized and of zero magnetization, or can be so magnetized that they are not biased. Alternatively or in combination therewith, regions with a magnetic bias can be provided which have differently shifted hysteresis loops and/or different preferred directions of the magnetic bias. This can apply especially to regions of magnetic bias according to strength and/or direction of different remanences. To the extent regions with magnetic bias directly bound one another or bound one another only with slight spacings, the respective neighboring regions should have differently shifted hysteresis loops and/or different preferred directions of the bias.

The magnetic stress in the aforedescribed sense, can be produced especially in that at least one antiferromagnetic first layer and, thereover, at least one ferromagnetic or ferrimagnetic, especially soft magnetic, intermediate layer are applied and that by the effect of a magnetic field, regions with magnetic bias are produced which effect a shifting to the hysteresis loop on the field strength axis. The effect of the magnetic field appears preferably already in the generation of the first and second layers to the extent that a magnetic field effect is not provided in the subsequently described special processes, first after the production of the first and second layers.

The first layer can extend over a plurality of mutually adjoining regions with magnetic bias. To the extent that the coding involves regions without a first layer, the second layer can also extend over these regions.

The antiferromagnetic first layer can be composed of an intrinsically antiferromagnetic material like, for example, Mn as well as NiO, MnFe or MnNi with preferably a ratio of 50:50 atomic parts, MnIr preferably with an atomic part ratio of 80:20 or CrMnPt preferably with an atomic part ratio of 40:50:10. All of these materials have a Néel temperature which lies substantially above room temperature whereby the stability of the magnetic bias is ensured. The ferromagnetic or ferrimagnetic second layer can be composed, for example of Fe, Co, Ni or an alloy of these metals, especially of a soft magnetic alloy like NiFe (permalloy) or an alloy of these metals with other elements, like for example FeAlSi or of a metallic metal oxide. On the combination of first and second layers, a suitable protective layer can additionally be applied, for example of SiC or DLC (diamond like carbon).

It is especially advantageous when the spatial distribution of the magnetic bias does not correspond to a targeted structured pattern, but rather is randomly generated. Thus the possibility of an unauthorized reproduction of the structure is significantly limited by the complexity of the spatial arrangement of the regions with magnetic bias.

The distribution of the magnetic bias can be of a one-dimensional form, for example, in the form of a magnetic strip, or can however be in a two-dimensional pattern, i.e. distributed over an area. To improve the signal, a multilayer construction can be provided, i.e. a repetitive sequencing of first layers and second layers.

With the invention it is advantageous for the magnetic regions to have saturation magnetizations of equal magnitudes. When the coding is subjected to an external magnetic field up to a saturation range, a homogeneous magnetization develops over the extent of the coding which forms a reference and enables a verification test. It will be understood that this is not however a compulsory prerequisite since the saturation magnetization can also vary over the extent of the coding. When these variations are stored, it can be determined via the verification test whether a manipulation has occurred or not. The coding as such is stored in the distribution of the magnetic bias.

The marking device according to the invention can be produced by forming an antiferromagnetic first layer on a carrier and then applying thereon a ferromagnetic or ferrimagnetic second layer, whereby the first layer and the second layer are so structured that they yield regions with magnetic bias. To the extent that there are regions directly adjacent one another, they should have different magnetic biases coupling in different directions with the second layer. Alternatively, it can be provided that the first layer is limited to spaced regions and the second layer is applied thereto, whereby the second layer can also cover the regions between the regions of the first layer. Then the regions of the first layer can be so constructed that they all have overall regions of identically oriented bias or be biased in at least two directions deviating from one another, coupled with the second layer. As an alternative thereto, it is proposed that the first layer be so formed in at least a part of the region that within a region zones of differently oriented magnetic coupling with the second layer are obtained.

Since the first layer and the second layer can be configured to be relatively thin so that the described magnetic effects arise, it has been found to be desirable to utilize vapor deposition technology to build up the layer, i.e. to use thermal vapor deposition, sputtering or the like. The first layer can then be built up from an antiferromagnetic material until it attains a thickness at which a stable antiferromagnetic preferred direction and thus a corresponding magnetic coupling with the second layer arises. Below this minimum thickness a magnetic bias is suppressed since the antiferromagnetic first layer has no locally fixed magnetic preferred direction. The magnetic preferred direction of the first layer rotates as a consequence of the coupling with the ferromagnetic layer upon demagnetization of the first layer. As a consequence the overall system has a hysteresis curve which is symmetrical about the zero point of the H axis and by comparison with the ferromagnetic second layer which is more spread.

According to a further feature of the invention, a protective layer is applied to the second layer, especially by vapor deposition.

The various ways in which the aforedescribed method can be carried out are described more concretely below. Thus the surface of the carrier can be provided, before the application of the first layer, with zones of different roughness. This is based upon the observation that the roughness of the carrier has a significant effect upon the magnetic coupling of the layers lying thereabove. By a corresponding adjustment of the roughness distribution, a regional magnetic bias condition can be obtained which is characterized by a hysteresis curve shifted about the zero point of the H-axis and regions with characteristic ferromagnetic properties with substantially higher coercivity can be created so that no clear magnetic state in remanence is obtained but rather a magnetization of the corresponding region is possible. The combination of the two regions enables information storage, therefore the coding.

In the simplest embodiment of the aforedescribed method, the surface of the carrier should have at least one zone with a first roughness and at least one zone of a second roughness. This does not exclude the possibility of providing zones with more than two roughnesses in order to make the coding more complex.

The method enables the first layer to be uniformly applied over the entire area of the carrier. It is, however, also possible to apply the first layer only regionally and also nonuniformly to the extent the basic features of the invention remain applicable.

The production of different roughnesses can be obtained in various ways. Thus the surface of the carrier can be smoothed by means of surface treatment and/or roughened, for example, by zone-wide etching, sputtering, ion bombardment, etc. In the latter case, the ion bombardment can be locally effected with the aid of a focused ion beam. As an alternative thereto it is however also possible to carry out the ion bombardment on a large area basis and to generate in the vicinity of the carrier a nonhomogeneous electric charge field which blocks the ions in a zonewise manner so that the ions only reach the carrier at locations where there is no blocking electric charge or an attractive electric charge is provided.

This can be so carried out, for example, that the carrier itself is nonhomogeneously electrically charged. However, an electrically chargeable underlay can be nonhomogeneously electrically charged and the carrier can be placed on this underlay, whereby the ion bombardment is then effected on the carrier. Advantageously the carrier foil is drawn from a supply and brought together with a continuously moved charging foil. Then they are again separated. In this case, the charging foil can also be drawn from a supply and then charged and after the ion bombardment, can be taken up on a store. Alternatively thereto, it can be provided that the charging foil is displaced in an endless path through an ion bombardment station and the charging foil can be charged upstream of the ion bombardment station and discharged downstream of the ion bombardment station or the electrical charge can be homogenized. In addition or in combination therewith it is possible to coat the surface of the carrier zonewise or to provide the surface of the carrier zonewise with different roughness coatings. This can be done by means of printing, lithography or vapor deposition, for example, sputtering.

To the extent zones with different roughnesses are generated by coating, the method according to the invention can provide the displacement of a carrier foil and a masking foil continuously from respective supplies from which they are drawn and then brought together and the application of the coating from the side of the masking foil, whereupon the masking foil is again separated from the carrier foil and the latter then provided with the first layer. In this case, the masking foil can be provided already before it is introduced into the supply with openings. Alternatively it is however possible to equip the masking foil with openings first after it has been withdrawn from the supply and before it is brought together with the carrier foil, for example with the aid of a cutting laser. The aforedescribed method with the aid of a masking foil can also be used for the ion bombardment to limit the surface-wise ion bombardment to zones of the carrier through the openings in the masking foil.

The aforedescribed method can be carried out with an apparatus which is characterized by:

a) a supply store for a carrier foil;
b) a supply store for a masking foil;
c) a surface treatment station for treating the carrier foil;
d) a receiving store for the take-up of the masking foil;
e) a receiving store for the take-up of the carrier foil; and
f) guide devices and a drive for feeding the carrier foil from the supply store through the surface-treatment station up to the receiving store and for bringing together the carrier foil and the masking foil but upstream of the surface-treatment station and for separating the carrier foil and masking foil downstream of the surface-treatment station.

With the aid of this device, a correspondingly treated carrier foil can be produced which is then removed from this device and introduced into a device for applying the first layer and the second layer, whereby in this device then corresponding coating stations are provided. It can however be advantageous for the surface treatment of the foil and its coating to be carried out in a single device in which the aforedescribed device is completed with the following apparatus parts:

a) a first coating station for applying the first layer to the carrier foil;
b) a second coating station for applying the second layer;
c) a receiving store for the take-up of the marking device;
d) guide units and a drive for feeding the carrier foil from the supply store through the surface-treatment station and the coating stations to the receiving store and for bringing together the carrier foil and the masking foil upstream of the surface-treatment station and for separating the carrier foil and masking foil upstream of the first coating station.

The coating stations are then provided with devices for producing a sufficiently strong magnetic field that they are suitable to establish the directions of the magnetic bias. The devices are so configured that directly above the carrier foil, between the coating stations and the carrier foil and at the location that the material meets the carrier foil, the magnetic field has a magnitude sufficient to establish the direction of the magnetic bias.

The apparatus according to the invention enables a rapid and economical production of the marking device, whereby the carrier foil can then be packaged depending upon the respective use purpose. The surface-treatment station and the coating station can also be assembled together to a station with multiple treatment units and/or coating units.

To the extent that the masking foil initially has no openings, between the supply store for the masking foil and the junction of the masking foil and the carrier foil, a mask-forming station is arranged for producing the openings in the masking foil whereby the mask-forming station preferably has a laser-burning device. In this case, a control device should be provided for locally varying the position of the laser-burning device.

The surface-treatment station can have at least one coating unit, preferably in the form of a vapor-deposition unit or a printing unit. Instead, a device for etching the surface of the carrier foil can also be considered.

The surface-treatment station can also be constructed with an ion-bombardment station for the ion bombardment of the carrier foil since the roughness of the surface can also be influenced by ion bombardment. The ion-bombardment station can produce a focused ion beam whereby a control device for the targeted control of the ion beam is provided. Such a focused ion beam can be eliminated, i.e. the ion bombardment can be effected over an area when an electrically chargeable carrier foil is passed through the ion-bombardment station and via the charging device is provided with a nonhomogeneous electric charge. A corresponding arrangement can be also achieved by passing through the ion-bombardment station an electrically chargeable charging foil which is provided with a nonhomogeneous electric charge and the feed device brings the carrier foil and the charging foil together upstream of the ion-bombardment station. Because of the pattern of the electric charge, the ion beam is blocked where the electric charge corresponds to the charge on the ions so that the ion beam only impinges in those zones of the carrier foil where the carrier foil or the charging foil is without an electric charge or has an opposite electric charge.

In carrying out the aforementioned proposal, a supply store for the charging foil can be provided upstream of the ion-bombardment station and a receiving store can be provided downstream of the ion-bombardment station while a charging device is provided between the supply station and the ion-bombardment station for applying an electric charge pattern. Alternatively, however, it is also possible to form a charging foil as an endless foil and via the guide devices to feed it together with the carrier foil through the ion-bombardment station, whereby a charging device is provided in the travel direction upstream of the ion-bombardment station and a quenching device is provided for quenching the charge or homogenizing the charge between the ion-bombardment station and the charging device. In this embodiment, the charging foil is discharged after traveling through the ion-bombardment station continuously or is provided with a homogeneous charge and is then returned anew to be written with the pattern whereby each writing can be carried out individually.

The charging foil can be fed over a plurality of rerouting rollers. It is however also possible to stretch the charging foil on a support roll which is juxtaposed with the ion-bombardment station. Instead of a foil, the roll periphery itself can be electrically chargeable, for example, by a correspondingly formed coating. Then a quenching device and a writing device should be located one after the other in the direction of rotation of the support roll and in the vicinity of the roll periphery which is free from the carrier foil.

According to a further feature of the invention, an additional coating station is provided to apply a protective layer on the second layer. The coating station is preferably vapor-deposition units with which very thin layers can be produced. For vapor deposition, especially thermal vapor deposition or sputtering are to be considered.

The supply store or the supply stores and the receiving store or receiving stores are advantageously formed supply chambers or storage rolls. In the coating stations and also in the surface-treatment stations, carrier rollers can be arranged over the roller peripheries of which the carrier foil is guided so that an effective treatment is possible.

A further fabrication method resides in that at least the first layer, in the layer buildup, is subjected to
 a) a nonhomogeneous magnetic field or
 b) a homogeneous magnetic field and nonhomogeneous temperature field or
 c) a nonhomogeneous magnetic field and a nonhomogeneous temperature field.

The distribution of this field creates a pattern of different magnetic properties and allows the first layer to be formed with a uniform layer thickness. Preferably the second layer is also provided under such field since thereby the pattern of the different magnetic characteristics and hence the coding is seen clearer. In this case the magnetic field distribution and/or the temperature distribution should be held invariable during the buildup of the two layers.

A magnetic field can for example, be produced in that a magnetizable carrier or a magnetizable underlay for the carrier is nonhomogeneously or homogeneously magnetized. In the latter case, the carrier is placed on this underlay and at least the buildup of the first layer is carried out on the combination of underlay and carrier. It will be understood that the second layer as well can be applied in the presence of such carrier or such underlay.

The marking device can be fabricated especially economically when a carrier foil is drawn from a supply and is brought together with a continuously moving underlay and both are fed through a first coating station in which the first layer is applied. In this case it is possible to separate the carrier foil and underlay already after the first coating station. To the extent that the second layer is also to be applied in the presence of a magnetic field, the carrier foil and the underlay can also be passed through a second coating station where the second layer is applied so that the carrier foil and underlay are first separated downstream thereof.

According to the invention it is further proposed that the magnet foil be drawn from a supply and then magnetized and that downstream of the first and second coating stations be collected in a store. Instead, the magnetic foil can be provided so that it circulates at least through the first coating station. To the extent that respectively changing nonhomogeneous magnetic fields are to be produced, the invention provides that the magnet foil be magnetized upstream of the first coating station and downstream of the first or second coating station be demagnetized or have its magnetization homogenized.

Instead of a magnetic foil, the magnetic field can also be built up by magnetic field generating coils whereby both a homogeneous magnetic field or a nonhomogeneous magnetic field can be produced.

A device for carrying out the aforedescribed method is characterized by
 a) a supply store for a carrier foil;
 b) a first coating station for building up the first layer;
 c) a magnetic field device juxtaposed with at least the first coating station for producing a magnetic field over the area of the carrier foil;
 d) a second coating station for applying the second layer;
 e) a receiving store for taking up the marking device;
 f) guide elements and a drive for feeding the carrier foil from the supply store through the coating stations to the receiving store.

In this device, the magnetic field unit can be disposed upstream of the first coating station and through it a magnetizable carrier foil can be passed. Instead of this, the magnetic field unit can have a magnet foil which is magnetized nonhomogeneously or homogeneously and the guide element can be effective to bring together the carrier foil and magnet foil upstream of the first coating station. In a more concrete arrangement, this can be achieved in that a supply store for the magnet foil is provided upstream of the first coating station and a receiving store downstream of the first or second coating station and the magnetic field device can have a magnetization unit for magnetizing the magnet foil and it is arranged between the supply store and the first coating station.

Instead of the latter, however, the magnet foil can have an endless configuration and can be guided by the guide elements together with the carrier foil at least through the first coating station. To the extent that a nonhomogeneous magnetization is provided, the magnet field unit can have a magnetizing device located upstream of the first coating station in the travel direction and which generates a nonhomogeneous magnet field and a quenching device for demagnetization or homogenizing the magnetic field between the first and second coating stations. The magnet foil can be passed freely over rerouting rollers. It can however also be stretched on a support roll which is juxtaposed with the first coating station.

As an alternative thereto it is proposed that the first coating station be juxtaposed with a support roll over the roll periphery of which the carrier foil is led past the coating station, whereby the roll periphery is magnetizable. To the extent that a nonhomogeneous magnetization is provided, the magnetic field device should have a magnetizing unit for magnetizing the roll periphery whereby a quenching device for demagnetization or homogenizing the magnetization is provided. In this case, the roll periphery can be provided with a magnetizable coating, for example in the form of a polymer layer with magnetic particles incorporated therein. The quenching device and the magnetizing device should be located one after the other in the direction of rotation of the support roll in the region of the roll periphery which is free from the carrier foil. Alternatively, the magnetic field device can be provided with a plurality of magnetic-field generating coils. These coils can be arranged in the vicinity of the surface of a carrier roll over the periphery of which the carrier foil is guided through the coating station so that during the vapor deposition a nonhomogeneous magnetic field prevails. The strength of the magnetic field generated is so selected that it suffices to fix the magnetic bias.

The same effect as can be accomplished with the magnetic field device can also be achieved by means of heating device for creating a nonhomogeneous temperature field, whereby the heating device can also be combined with a magnetic field device so that both a nonhomogeneous magnetic field and also a nonhomogeneous temperature field can be generated. The heating device can, for example, be provided with a laser unit by means of which the first layer can be locally heated during its buildup.

The method of the invention can also be carried out such that, upon the application of the first layer, at least one mask is used to cover the regions in which at least temporarily there is to be no first layer buildup. This can be achieved, for example, by the use of a single mask during the formation of the first layer to limit it to certain regions so that the other regions remain first layer free. Instead, however, the method can be so carried out that two layers are deposited on the carrier and one of these layers can be deposited without a mask and another layer regionally with use of a mask, whereby the thicknesses only in the region of superposition of the layers suffices for the formation of a magnetic bias with shifting of the hysteresis cover. In the other regions, a widened symmetrical hysteresis curve arises so that the coding is given by the sequence of these regions. Hence the masks can be used alternatively in the buildup of the first or of the second layer.

The mode of carrying out the method is also possible in which the formation of the first layer utilizes a first mask regionally in a first position and then in a second position utilizing a second mask covering the first layer, whereby the thicknesses of one of the two layers is so small that in these regions no magnetic bias arises. In this case it is advantageous when the first layer is applied with a differently oriented magnetic field than the second layer so that as a result differently directed magnetic biases will arise.

So that the marking device can be fabricated in a continuous process, the invention provides that a carrier foil and at least one mask foil are drawn continuously from respective supplies and brought together and that then the coating is effected from the side of the masking foil and the masking foil or foils are then separated from the carrier foil. The masking foil is provided with cutouts which, before and after withdrawal from the supply, the latest however before the masking foil is brought together with the carrier foil, can be formed in the masking foil.

The device for carrying out the aforedescribed method can be configured similarly to the device which has been proposed above for the zonewise coating of the carrier foil using a masking foil. Deviating from this device, however, the masking foil is fed through the first coating station so that the first layer on the carrier foil is initially formed only in the regions left free from the masking foil. In this case, the first coating station can have at least two coating devices disposed one after the other, whereby the masking foil is fed together with the carrier foil only through one of the coating devices. As a variant thereon, each of the coating devices can have a supply store for a masking foil and a receiving store for taking up the masking foil associated therewith.

A further fabrication mode is characterized in that the first layer is initially applied on a wide area basis and then a portion of the first layer is regionally removed to such an extent that there no magnetic bias arises. With this method it is possible to apply the first layer initially with a uniform thickness and under a homogeneous magnetic field with the thicknesses so dimensioned that after application of the second layer, a magnetic bias arises. By local ablation of the first layer, regions are formed in which no magnetic bias is effective because the requisite thickness for the magnetic prestress no longer exists or the first layer has there been completely removed.

In this manner the desired signature (coding) is formed. The ablation can be effected, for example, by means of chemical etching, whereby the regions which are not to be etched are covered by means of a lithographic technique. Instead, an ion sputtering etching or ion etching can be carried out which is especially suitable for a continuous process using a carrier foil.

The last-mentioned method can be carried out by means of an apparatus which is similar to the apparatus described previously in which the carrier foil is roughened by means of ion bombardment in a zonewise manner. A difference as to this apparatus is the ion bombardment station now located between first and second coating stations in order to regionally remove the first layer. The restriction of the ion bombardment to individual regions can be obtained with the same means as described above, thus for example, by the effect of a focused ion beam or by limiting the effect of an ion beam bombardment over an area, for example, with the aid of a mask, also in the form of a foil, or by impressing a nonhomogeneous electric charge in the region of the carrier. The latter can be done by means of an electrically chargeable carrier foil or with the charge foil already described above and which is brought together with the carrier foil in the region of the ion bombardment station and supplies a corresponding nonhomogeneous electric field that regionally blocks the ion beam so that it in these regions, does not serve to remove the first layer.

In a further fabrication method, the first layer is galvanically applied and the application is controlled with respect to place and thickness by a nonhomogeneous electric field. This is then so carried out that the metal ions for the first layer are blocked by the electric field regionally and regionally pass, indeed in such form that on the carrier regions with positive and regions with negative electric charge are generated. There where the charge is negative, the positively charged metal ion will be deposited for the purpose of regional buildup of the first layer while they will be blocked in regions of positive charge.

The aforedescribed method is involved also in the fabrication of the marking device. It is however also possible to produce regions of different magnetic bias first after the creation of the coding. Such a method is characterized in that the coating is heated locally to such a temperature that there the magnetic coupling between first and second layers is altered and indeed preferably in the sense that the magnetic bias is destroyed and the magnetization in these regions has a symmetrical hysteresis curve. As an alternative to the aforementioned method, it can be provided that the coding after manufacture is heated with a homogeneous temperature field to such temperature that the magnetic coupling between first and second layers is altered, especially destroyed and the coding is simultaneously with a nonhomogeneous magnetic field, applied. The latter can be done with a magnet foil as has been described above already in conjunction with the application of a nonhomogeneous magnetic field in the buildup of the first layer.

The aforedescribed method allows, during fabrication of the coding, a uniform thickness of the first and second layer to be created. It is suitable especially for continuous coating processes. To the extent that a local heating is carried out, this can be done by means of a laser.

The apparatus for carrying out this method can be configured similarly to the aforedescribed apparatus in which the first layer is regionally removed by means of ion bombardment. Instead of the ion bombardment station, a heating station is now provided for heating the coating between the second coating stations and the receiving store for taking up the marking device. The heating station can be provided with a heating device for local heating of the coating whereby, in addition thereto, still another magnetizing device can be provided. Instead, the heating station or a heating device for homogeneous heating of the coding can have a magnetizing device for producing a nonhomogeneous magnetic field. The magnetization device can be configured exactly in the same manner as has been described in conjunction with the buildup of the first layer using a nonhomogeneous magnetic field.

A variation of the magnetic coupling can, for example, also be achieved by means of local ion bombardment. This approach to producing a signature is also suitable for continuous manufacturing processes of the aforedescribed type. To the extent that the apparatus is concerned, one need only replace the heating station of the last-described apparatus by an ion bombardment station which is configured in the identical way as in the apparatus where the ion bombardment is effected for regionally removing the first layer.

The aforedescribed methods and apparatuses for producing the marking device according to the invention can also be combined with one another. The methods and apparatuses will then be somewhat more expensive. With the aid of such combined methods and apparatuses, however, still more complex codings can be produced without the need for random generators such that such codings are unique and imitation is practically impossible.

The subject of the invention is, moreover, a method of reading out the above described marking devices with the aid of at least one magnetic field sensor. According to the invention, the coding is subjected to at least two reading processes whereby one reading process if effected in a zero field and one reading process is effected in an external magnetic field or the reading processes are effected in different magnetic fields. In the first-mentioned reading process, the stored information of the magnetic regions is locally detected, for example, by reading out the sequence of flux changes arising at the region boundaries. In the second reading process which preferably is carried out under saturation magnetization, the distribution of the saturation magnetization is detected and compared with a predefined reference structure. The sequence of the reading processes does not matter.

It is further of advantage that for the reading of the marking device according to the invention, conventional magnetic field sensors are suitable, i.e. for example, inductive sensors, magneto-resistive sensors, magneto-optical sensors, Hall-sensors or SQUID-sensors can be used. The local reading can be effected by causing a relative movement between the magnetic field sensor and the marking device and it makes no difference whether only one or both of them are moved. A plurality of magnetic field sensors can also be used to detect the magnetic structure of the marking device in a rest state at a particular location.

To determine the information stored in the coding, various features of the hysteresis loop can be considered. It is simple to detect the remanence in a zero field or a very small magnetic field. Instead it is however also possible to detect the flux change at the boundary of two regions since with the marking device according to the invention, at the boundary stray fields arise whose distribution in a particular direction forms the coding.

Finally according to the invention a method is also provided in which at least two reading processes are carried out without an external magnetic field and the coding before a reading process in one direction and before a further reading process in the other direction is magnetized up to saturation.

BRIEF DESCRIPTION OF THE DRAWING

The invention is described in greater detail in connection with exemplary embodiments in the drawing. In the drawing.

SPECIFIC DESCRIPTION

Figure 1:
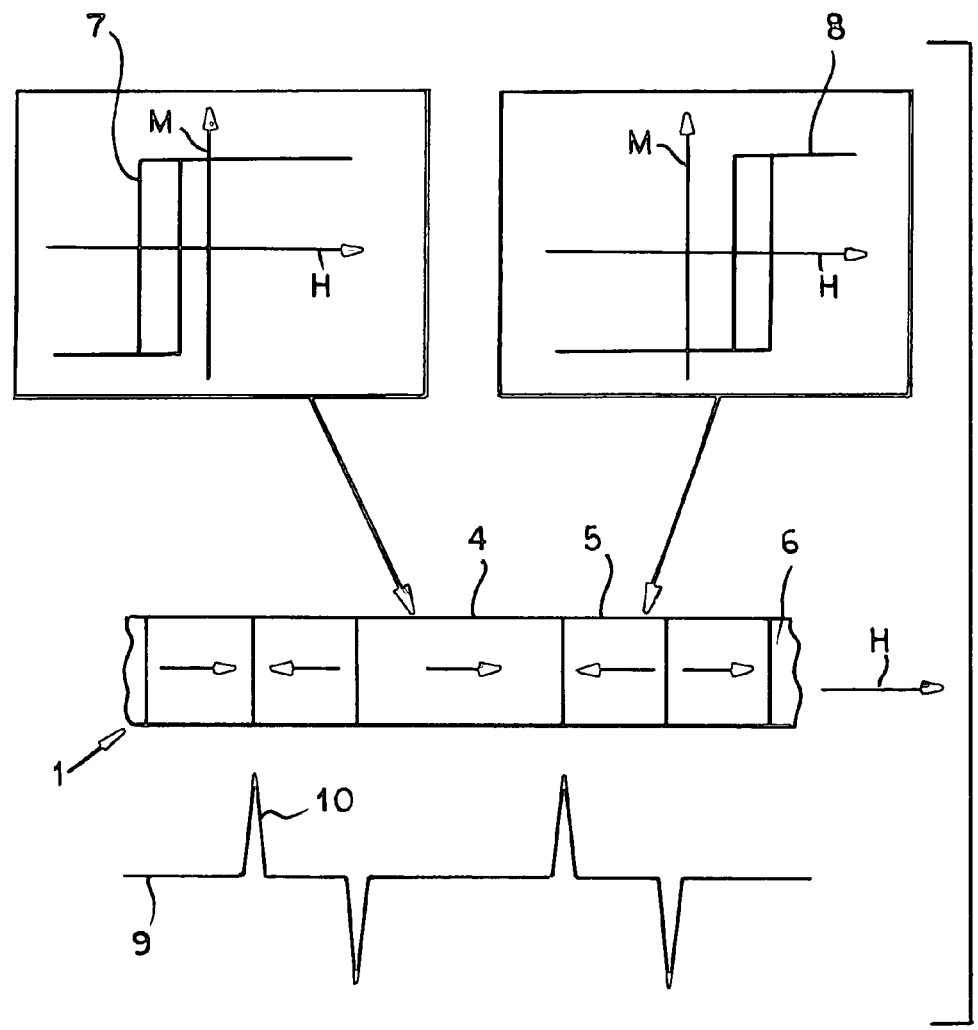
FIG. 1 is a plan view of a part of a first marking device with illustration of the hysteresis loops of two magnetic regions and the signal course.
Figure 2:
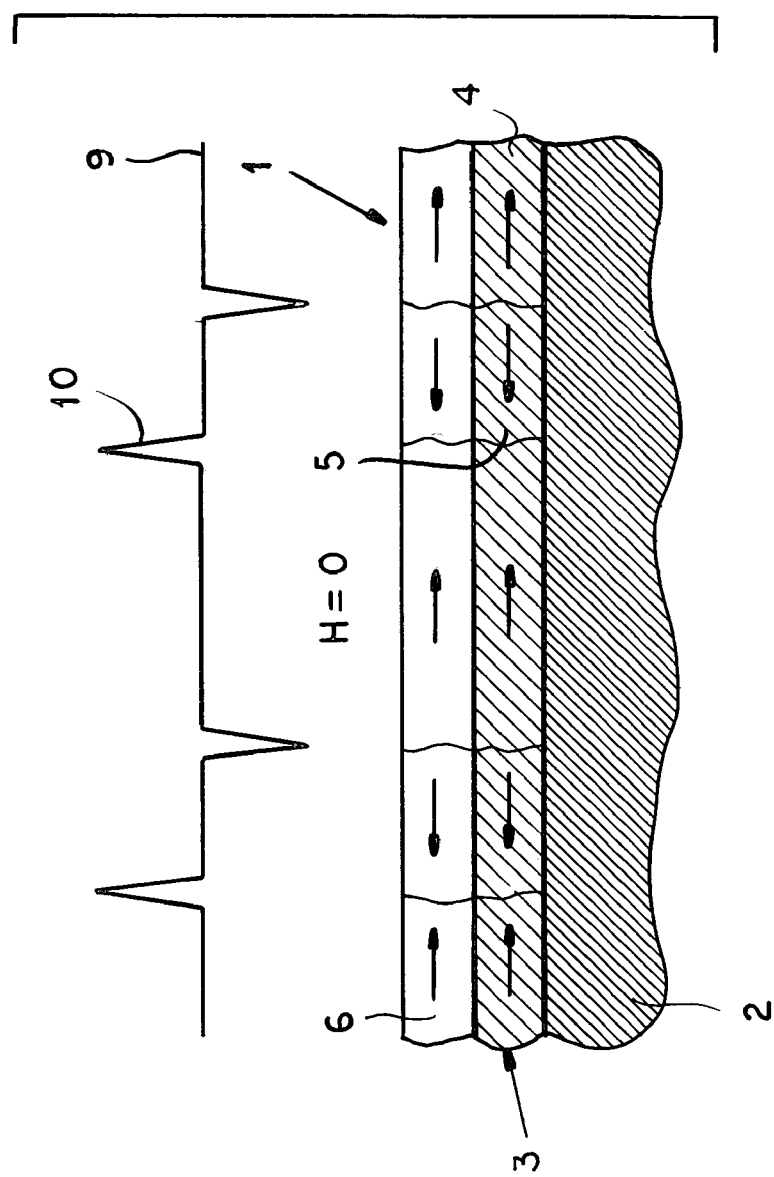
FIG. 2 is a longitudinal section through a marking device according to FIG. 1 with illustration of the signal course without an externally applied magnetic field.

As FIGS. 1 and 2 show, the marking device 1 is configured as a magnetic strip which is applied to a carrier 2. The carrier 2 can be affixed to any optional object which is to be identified by means of the marking device 1.

The marking device 1 is two layered, whereby the thicknesses of the layers amounts to between several nanometers and several hundred micrometers. The antiferromagnetic first layer 3 is initially applied to the carrier 2 and is comprised of a multiplicity of mutually adjacent regions, for example designated at 4 or 5, with different directions of the antiferromagnetic preferred axes. On the first layer 3 a ferromagnetic second layer 6 is vapor deposited. The first layer 3 is so configured as a result of the fabrication method described in detail above, that on the interface with the second layer 6 magnetic preferred directions obtain which are illustrated by the arrows. In this case, the preferred directions of two respectively neighboring magnetic regions 4, 5 are opposite one another. By means of the first layer 3, a corresponding preferred direction is also induced in the respective second layer 6, also illustrated by the arrows in FIGS. 1 and 2. As a result a magnetic bias of the second layer, which is manifested in a shifting of the hysteresis loops on the field strength—H—occurs and indeed, in the magnetic region 4 is to the left with reference to the magnetization axis M and is to the right in the magnetic region 5.

Because of the opposite biases of two neighboring magnetic regions 4, 5, magnetic stray fields or flux alterations are produced in remanence at the boundaries between two neighboring magnetic regions 4 and 5 and can produce a signal in an appropriate magnetic field sensor which corresponds to the signal course 9 shown below. The signals, for example, indicated at 10 give, based upon their orientation and spacing, a coding-forming structure when no external magnetic field is applied, i.e. H=O (FIGS. 1 and 2). When an external magnetic field is applied in the saturation range ($H>H_S$), the magnetic moments of the ferromagnetic layer 6 orient themselves in the direction of the external field, i.e. there is in the reading direction a uniform magnetization with the consequence that the signals 10 disappear.

Figure 3:
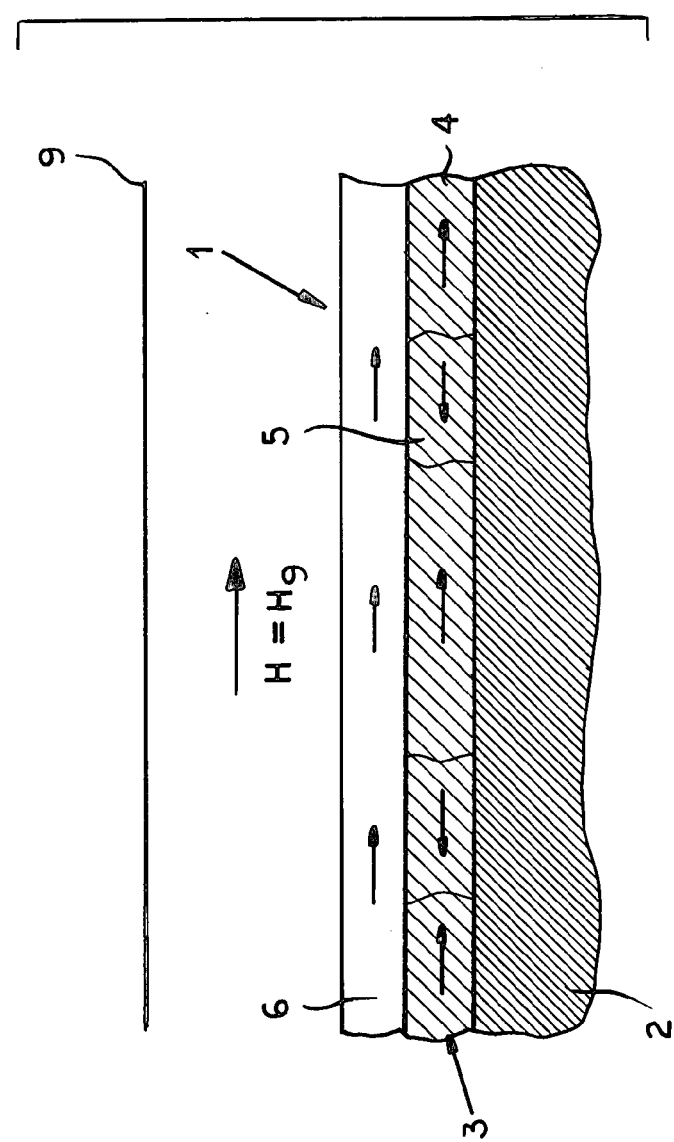
FIG. 3 is a longitudinal section through a marking device according to FIGS. 1 and 2 with illustration of the signal course with saturation magnetization.
Figure 4:
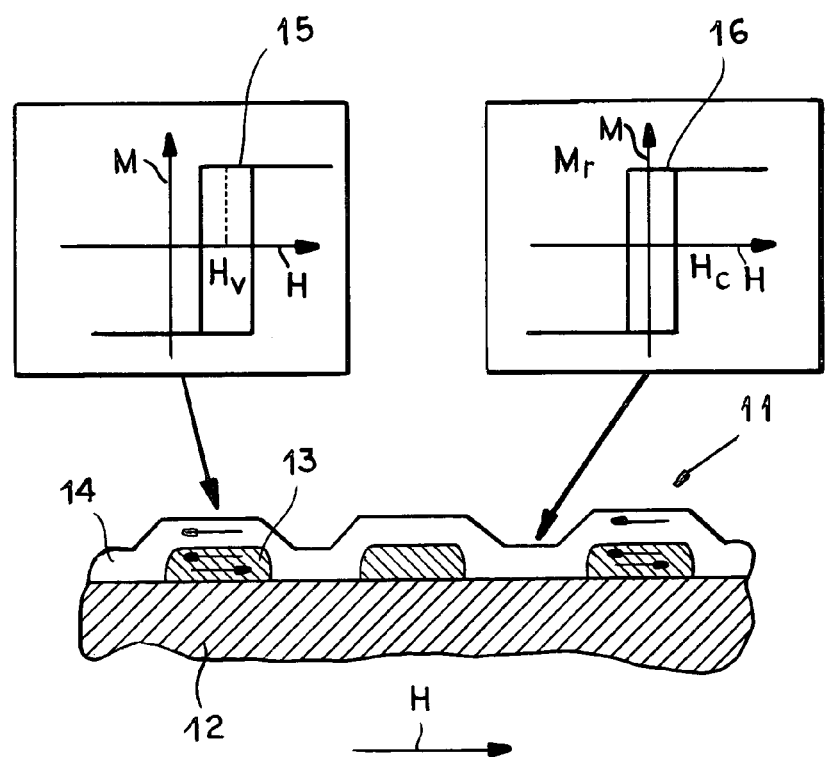
FIG. 4 is a longitudinal section through a part of a second marking device in remanence with illustration of the hysteresis loops of two magnetic regions.

With the marking device 11 according to FIG. 4, on the carrier 12, spaced-apart antiferromagnetic segments respectively form a first layer which has been, for example, indicated at 13, i.e. form the antiferromagnetic first layer 13 which is not a closed layer as with the marking device 1 according to FIGS. 1 to 3. The ferromagnetic second layer 14 is vapor-deposited thereover and also covers the regions between the antiferromagnetic segments 13 and which there lies directly on the carrier 12.

In the vicinity of the antiferromagnetic segments 13, there is a magnetic bias because of the unidirectional preferred direction at the interface of the second layer in all regions of the first layer 13, the magnetic bias being symbolized by the left-indicating arrows, and in which there is a shift of the associated hysteresis loop to the right on the field strength axis H. In the regions between two antiferromagnetic segments 13, there is no voltage, i.e. there is here a hysteresis loop 16 which lies symmetrical to the magnetization axis M. In this case the formation of a spatial structure of the remanent magnetization is here associated with the directions of the field which is used for magnetization. If the field is opposite the preferred direction—i.e. in this case to the right up to saturation, there is after cutoff of the rotating field, a sequence of differently oriented remanent magnetizations corresponding to the illustrated hysteresis loops 15, 16. If one magnetizes the marking device in the preferred direction of magnetic bias up to saturation, there is also a magnetization of the ferromagnetic regions in the direction of magnetic bias and the signature disappears. This property can be used for a verification test.

Figure 5:
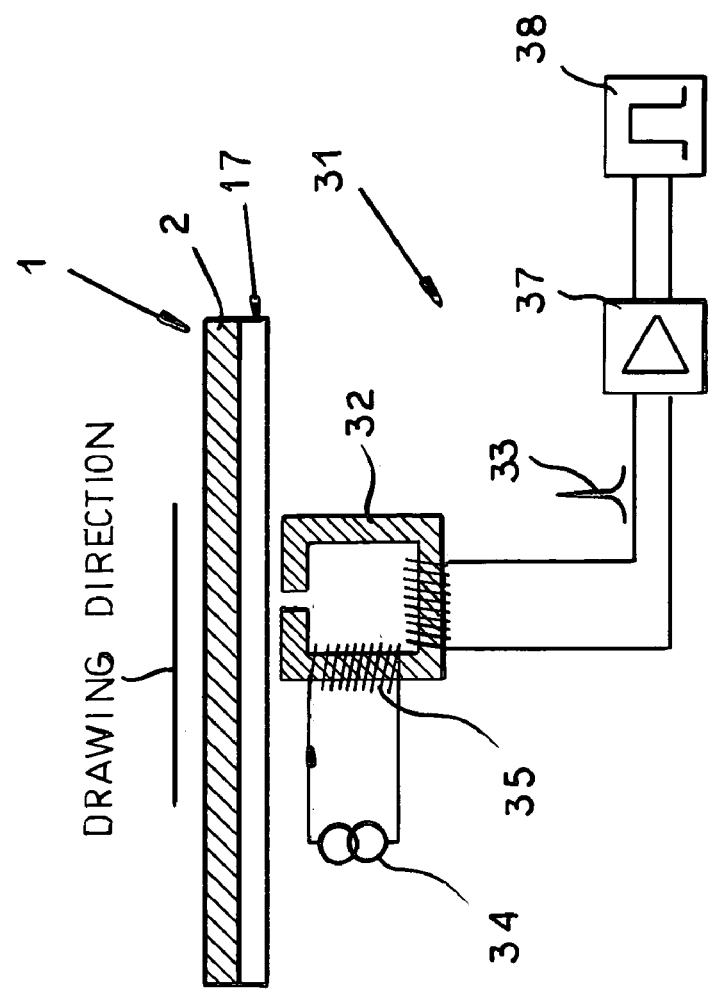
FIG. 5 is an illustration of the principles of a marking device with a magnetic field sensor.

In FIG. 5 the marking device 1 has been shown in a rotated position so that the carrier 2 lies on the upper side and the coding layer 17 is found on the underside. Below it a magnetic field sensor 31 is arranged which has a reading head 32 past which the marking device 1 with the carrier 2 is displaced in pull-through direction. At the boundary of the differently magnetized regions in the zero field, a stray field is generated which induces a current pulse 33. Via an external current source 34, an additional current is fed into a coil 35 at the reading head 32, whereby an external magnetic field is generated at the locus of detection. The signal which is produced on reading is processed in an amplifier stage 37 and in a further stage 38. If the external current is equal to zero, the stored information can be read.

If the current is sufficient to saturate the coding layer 17, the current pulse 33 disappears. A verification test of the coding is thus possible.

It is especially advantageous when the magnetic field sensor 31 and the coding layer 17 are so matched that the saturation field corresponds to a field strength in which the characteristic of the magnetic field sensor 31 is linear to enable a distinction between saturation of the coding and saturation of the magnetic field sensor 31 to be recognized. A further possibility for overcoming the saturation problem of various magnetic field sensors, for example inductive or magneto-resistive magnetic sensors is to apply the saturation field in a direction which does not correspond to the sensitive region of the magnetic field sensor. It is also advantageous to use a magnetic field sensor which is capable of detecting the local magnetization of the layer (for example a magneto-optical reading device) so that an influence of the external field on the sensitivity of the magnetic field sensor can be excluded.

Figure 6:
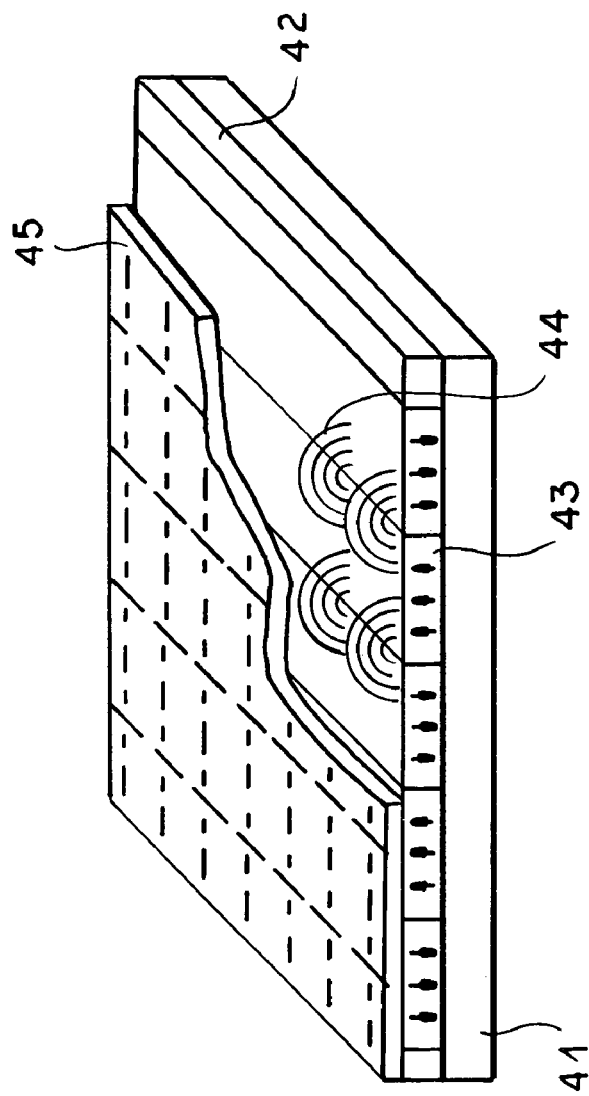
FIG. 6 is a perspective view illustrating of the principles of making a nonhomogeneous magnetic field by means of a magnetized underlay.

FIG. 6 shows a carrier plate 41 on which a magnetic foil 42 is placed. The magnetic foil 42 is perpendicular to the layer plane in strips, for example, as shown at 43, and in particular, with one strip 43 with a preferred direction downwardly and an adjacent strip 42 with a preferred direction upwardly as symbolized by the arrows. This gives a stray field configuration which has been indicated diagrammatically by the half circles 44. The thus formed stray field is sufficient to establish a magnetic bias.

The carrier foil 45 is laid upon the magnet foil 42 which produces a magnetic field distribution whose components in the layer plane vary in correspondence with the underlying pattern as shown by the horizontal arrows on the carrier foil. By vapor depositing a suitable material combination (for example NiO/NiFe) on the carrier foil 45, the magnetic field distribution determines the spatial distribution of the magnetic bias and thus the signature of the coding.

Figure 7:
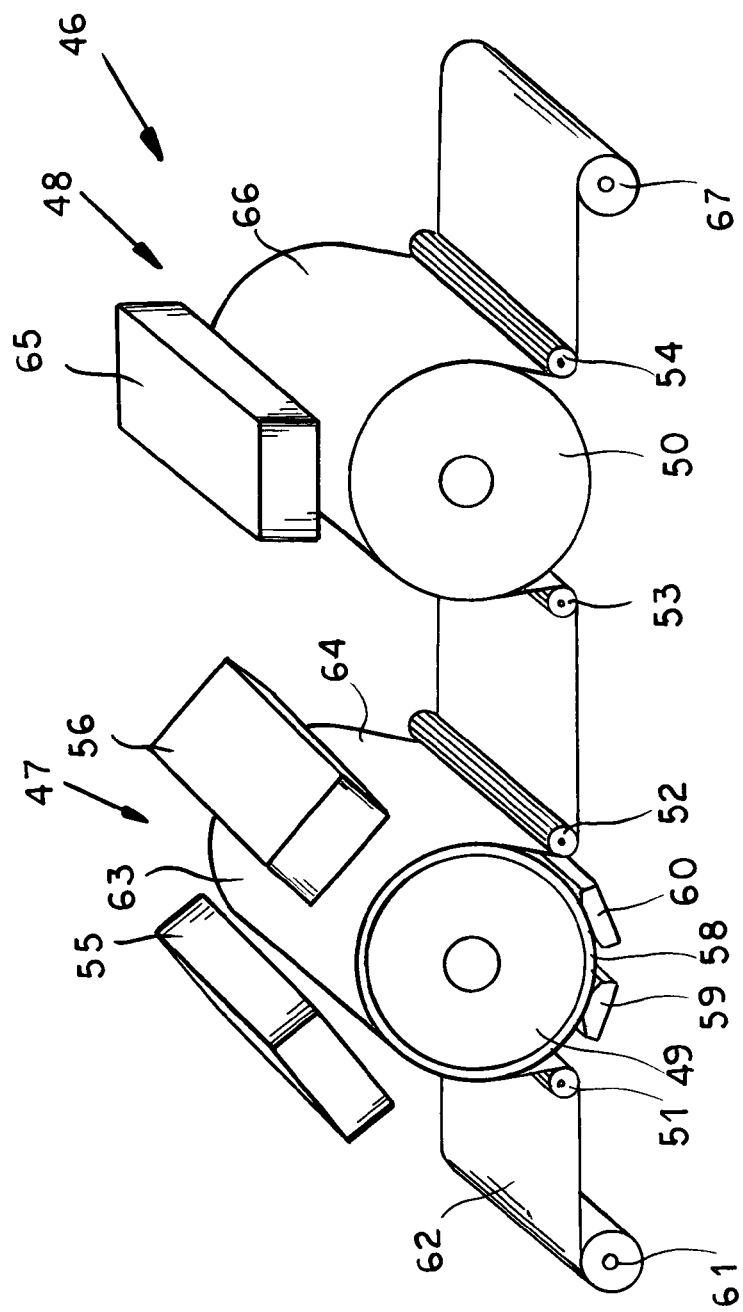
FIG. 7 is a perspective view of an apparatus for producing a marking device by buildup of the first and second layers in a nonhomogeneous magnetic field.

FIG. 7 shows an apparatus 46 in which the system shown in principle in FIG. 6 can be manufactured in a continuous process. The apparatus 46 is contained in a housing not shown in greater detail herein in which a high vacuum prevails.

The apparatus 46 has two vapor deposition stations 47, 48, each of which has a support roll 49, 50 which in its lower region is flanked by respective deflection rollers 51, 52 or 53, 54.

The first vapor deposition station 47 is provided above the associated support roll 49 with two vapor deposition devices 55, 56. The support roll 49 is provided along its roll periphery with a magnet layer, for example an approximately 3 mm of thin polymer layers in which a high proportion of ferromagnetic particles are incorporated. Below the support roll 49 and between the associated rerouting rollers 51, 52 a magnetic unit 59 is provided on the left side which has a row of permanent magnets and/or magnetic-field generating spools. These can provide the magnet layer 58 with a certain magnetization pattern which in its simplest form can be seen in FIG. 6. The magnet layer 58 produces, as a consequence of its magnetization, a corresponding nonhomogeneous magnetic field. At the right adjacent the magnetization device 59, a quenching unit 60 is arranged which either completely demagnetizes the magnetic layer 58 or magnetizes it homogeneously and thus eliminates the nonhomogeneous magnetization previously applied by the magnetization device 59.

On a supply roll 61, the carrier foil 62, for example a polyester foil, has been rolled up. In operation, the carrier foil, by driving the support roll 49, 50, is withdrawn from the supply roll 61, loops around the first rerouting roller 51 and passes onto the magnetic layer 58 where it is entrained by the rotation of the support roll 49. In the first vapor deposition device, a first layer 63 is applied to the carrier foil 62 of antiferromagnetic NiO and by means of the second vapor deposition device 56, a second layer 64 of ferromagnetic NiFe is applied. By the spatial magnetic field distribution, established by the magnetic layer 58, the desired directional distribution of the magnetic bias is produced.

After passing around the rerouting rollers 52, 53, the carrier foil 62 passes into the second vapor deposition station 48 where it runs onto the periphery of the associated support roll 50 and rotates with the support roll 50. The foil then passes a vapor deposition device 65 which applies over the entire area a protective layer 66 of, for example, DLC (diamond-like carbon) or SiC. After traversing the second vapor deposition station 48, the carrier foil 62 loops around the last rerouting roller 54 and is taken up by a storage roll 67. It can then be subdivided.

Figure 8:
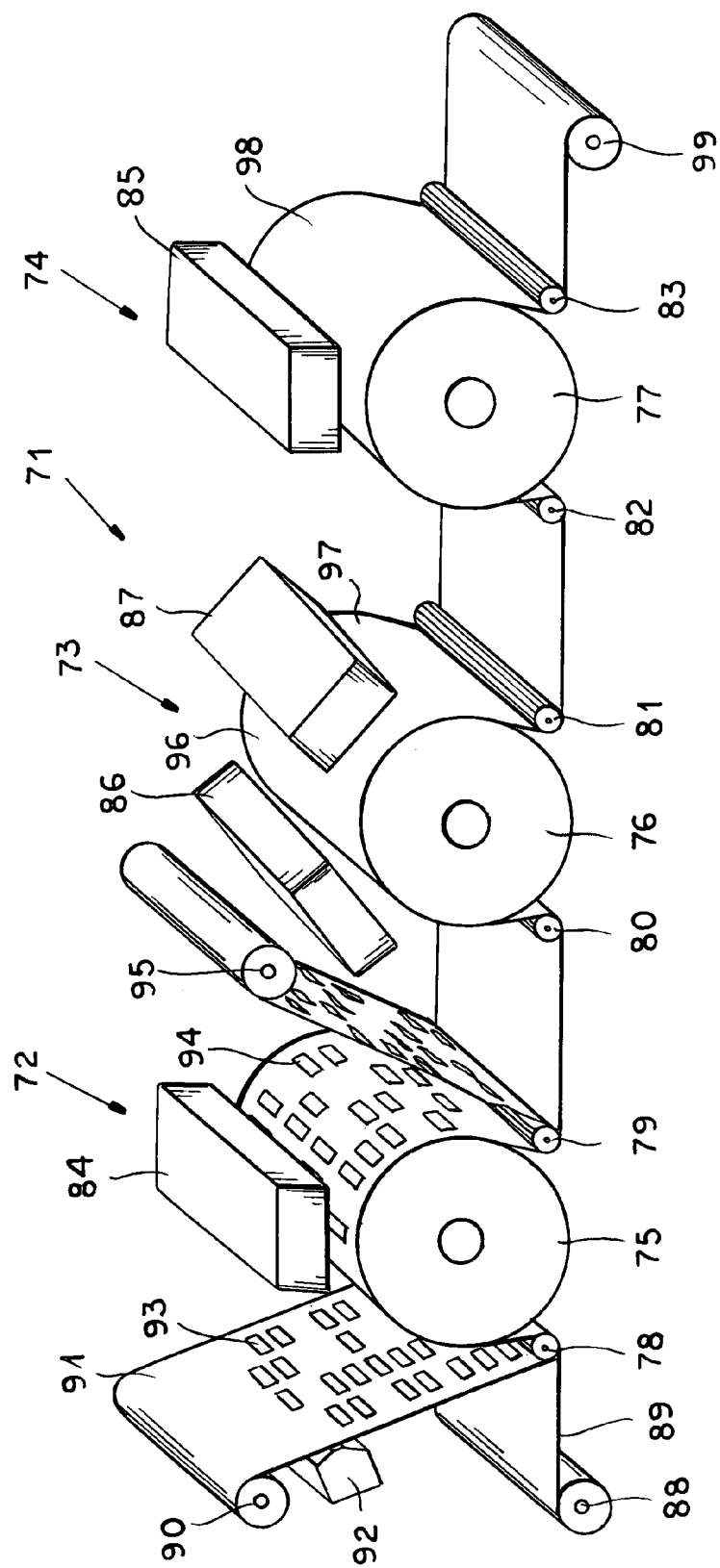
FIG. 8 is a perspective view of an apparatus for producing a marking device by means of a masking foil.

In the device 71 of FIG. 8 another fabrication method is used. The device 71 has a first vapor deposition station 72, 73 and a second vapor deposition station 74, whereby the vapor deposition stations 72, 73, 74 have support rolls 75, 76, 77 which are flanked in their layer region by respective rerouting rollers 78, 79 or 80, 81 or 82 83. Above the first and third support rolls 75, 77 are respective vapor deposition devices 84, 85. The middle support roll 76 is juxtaposed with two vapor deposition devices 86, 87 disposed one after the other in the peripheral direction.

Upstream of the first support roll 75 there is a supply roll 88 on which the carrier foil 89 is rolled up. Above the supply roll 88 is a further supply roll 90 on which a masking foil 92 is rolled up. The further supply roll 90 is associated with a laser unit 92 with the aid of which cutouts—for example indicated at 93—are burned out of the masking foil 91.

In operation, the carrier foil 89 and the masking foil 91 are drawn with the same speed from their supply rolls 88 or 89, for example, by driving the support rolls 75, 76, 77. As a result, in the masking foil 99, shortly downstream of the supply roll 90, a pattern of cutouts 93 are burned into the masking foil with the aid of the laser unit 92. By corresponding control of the laser beam produced by the laser device 92, there can also be a plurality of them, a predetermined or, for example, a continuously changing random pattern as produced by a random generator, can be formed.

The carrier foil 89 and the masking foil 91 travel on the first rerouting roller 78 together and are entrained by the support roll 75. The masking foil 91 lies to the outside of the carrier foil 89 and against the latter. Both are passed along the upper region support roll 75 past the first vapor deposition unit 84 which deposits a first ferromagnetic layer 94 only in the regions of the cutouts 93 on the carrier foil 89. After passing around the rerouting roller 79, the masking foil 91 is guided away from the carrier foil 89 upwardly and is rolled up on a storage roll 95. The carrier foil 89 travels then horizontally to the next rerouting roller 80 and then loops around the support roll 76 there. With the aid of the vapor deposition unit 86, a second ferromagnetic layer 96 is applied over the entire area to the carrier foil 89. The layer thickness lies below that which is required for a magnetic bias. In the regions corresponding to the cutouts 93 in the masking foil 91, where there is already a first layer 94, the thicknesses of the first and second layers 94 and 96 add to a thickness which lies above the minimum required layer thickness for the magnetic bias.

With the aid of the second vapor deposition unit 87, a ferromagnetic second layer 97 is applied over the entire area.

This forms together with the antiferromagnetic layers 94, 96, a system of first and second layers 94, 96, 97 which in regions of the cutouts 93 has a magnetic bias in the direction of the applied magnetic field which, during the vapor deposition by the vapor deposition unit 84, 86, 87 is produced over the carrier foil 89 by suitable permanent magnets or electromagnets. In the regions which did not correspond to cutouts 93 and were thus kept free in the first vapor deposition, the antiferromagnetic layer 94, 96 does not have the requisite thickness so that there a nonbiased hysteresis curve symmetrical to the zero point of the H-axis prevails.

Next the thus coated carrier foil 89 loops around the rerouting rollers 81, 82 and passes onto the last support roll 77. With the aid of the further vapor deposition unit 85 there provided, a support layer 98 is applied to the ferromagnetic second layer 97. After passing the last rerouting roller, the carrier foil 89 provided with the coating layer is rolled up on a storage roll 99. It can then be packaged in accordance with the use.

Figure 9:
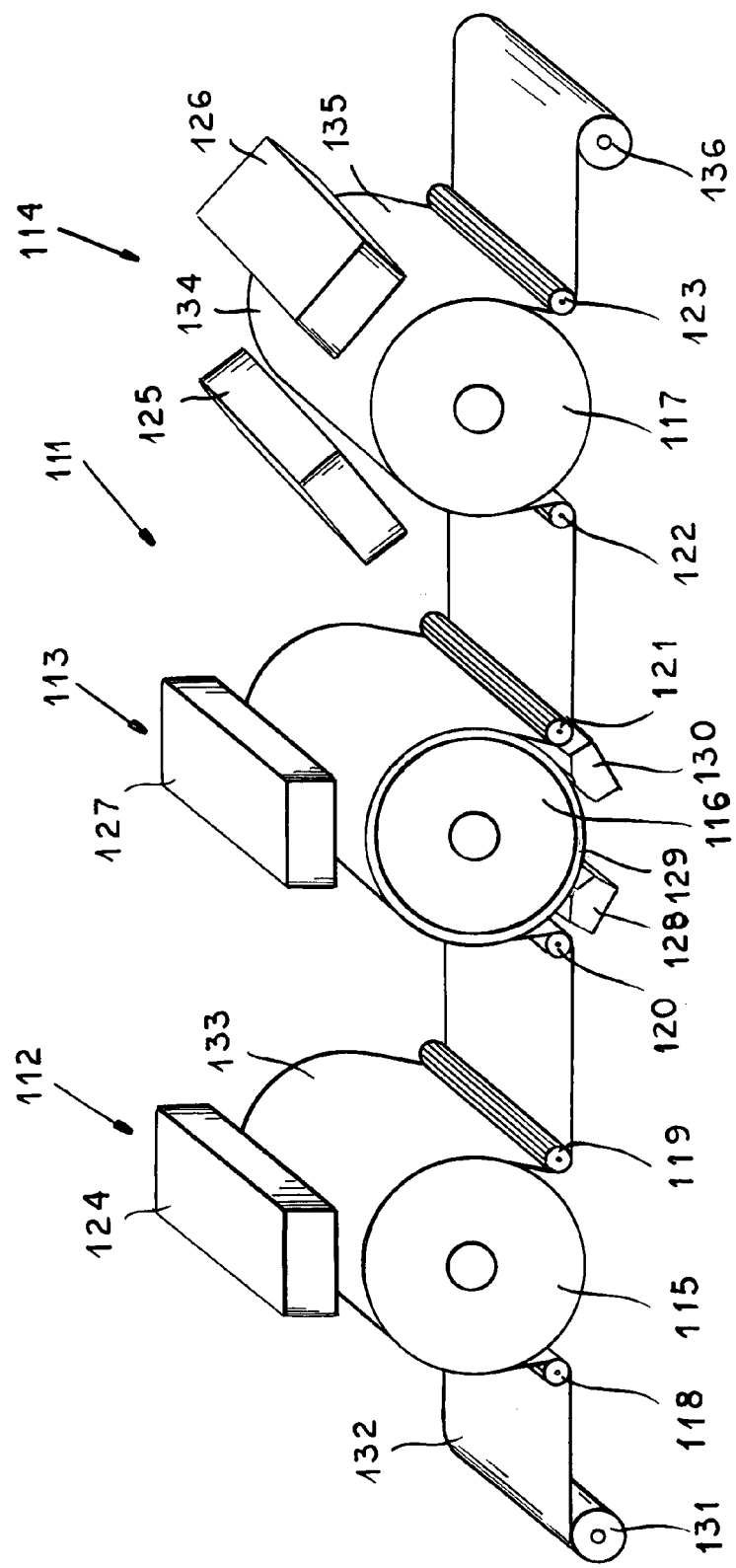
FIG. 9 is a perspective view of an apparatus for producing a marking device by means of ion bombardment of the first layer.

FIG. 9 shows a further apparatus 111 for producing a marking device with magnetic bias applied regionally. It has in the sequence in the direction of travel a first vapor deposition station 112, an ion bombardment station 113 and a second vapor deposition station 114. The stations 112, 113 and 114 have support rolls 115, 116, 117 which are respectively flanked in their lower regions by two rerouting rollers 118, 119 or 120, 121 or 122, 123.

The first vapor deposition station 112 is provided with a vapor deposition unit 124 above the support roll 115. The second vapor deposition station 114 has in its upper region two vapor deposition units 125 and 126 disposed one after the other in the peripheral direction of the support roll 117. In the ion bombardment station 113, above the respective support roll 116, an ion bombardment unit 127 is arranged. Below the support roll 116 and between the associated rerouting rolls 120 121 is a charge distributor 128 disposed at the left side and with which the support roll 116 can be provided with regions with positive charge and/or regions with negative charge. This can be achieved for example in accordance with the principles of a laser printer. For this purpose, the support roll 116 is provided with an electrically-chargeable coating 129. To the right of the charge distribution device 128, a quenching device 130 is arranged which can either completely discharge the support roll 116 or provide it with a homogeneous electrical charge.

On a supply roll 131 a carrier foil 32 is rolled up. In operation, the carrier foil 132 drawn from the supply roll 131 by driving the support rolls 115, 116 117, the carrier foils passing around the first rerouting roller 118 and onto the periphery of the first support roll 115 with which it is entrained. Then the carrier foil travels past the first vapor deposition device 124 and is there provided by sputtering under a homogeneous magnetic field with an antiferromagnetic first layer 133 which has a layer thickness which suffices for effective magnetic bias. With this first layer 133 the carrier foil 132 loops around the following rerouting rollers 119, 120 and passes onto the periphery of the second support roll 116 and loops about the later. It thus travels past the ion bombardment unit 127 which fires upon the first layer 133 over the entire width of the carrier foil 132. Because of the charge distribution on the surface of the support roll 116, which has been provided previously by the charge distributing device 128, there are formed on the surface of the first layer 133 regions of blocking and attracting potential for the ions of the ion bombardment device 127. In the regions with attracting potential, the first layer 133 is ablated to a thickness which lies below that which is required to effectively maintain a magnetic bias.

The support roll 116 is homogenized as it passes the quenching device 130 upstream of the charge-distribution unit 128, i.e. is either completely discharge or provided with a homogeneous charge so that the charge distribution device 128 always charges the support roll 116 with a new randomly generated distribution pattern.

After passing around the rerouting rolls 121, 122, the carrier foil 132 arrives at the second vapor deposition station 114 in which it again is fed around the periphery of the support roll 117. There the first layer 133 is coated over its entire area with the aid of the vapor deposition unit 125 with a second layer 134 of ferromagnetic material under a homogeneous magnetic field, the second layer having a suitable thickness and orientation. In the regions in which the first layer has not been ablated by ion bombardment, there arises a magnetic bias with a shift of the hysteresis curve.

In the further vapor deposition unit 126, the second layer 134 is provided with a protective layer 135. The carrier foil 132 then loops around the last rerouting roller 123 and is rolled up on a storage roll 136. It can then be subdivided into individual pieces.

It will be understood that also in FIGS. 8 and 9, the devices 71 and 111 are within a housing which is under high vacuum.

The invention claimed is:

1. A marking device for the identification of an object and formed on the object with laterally offset regions with different magnetic characteristics, wherein the laterally offset regions being adjacent magnetic regions which are so magnetically biased or manufacture that hysteresis loops thereof are shifted differently to each other on a field strength axis (H) relative to a symmetrical pattern on a magnetization axis (M).

2. The marking device according to claim 1 wherein regions with magnetic bias are spaced apart.

3. The marking device as defined in claim 2 wherein between regions with magnetic bias regions are disposed that are not magnetically biased.

4. The marking device according to claim 1 wherein regions with different magnetic bias border one another.

5. The marking device according to claim 1 wherein regions with magnetic bias comprise a layer system having at least one antiferromagnetic layer and at least one ferromagnetic or ferromagnetic or soft magnetic second layer.

6. The marking device according to claim 5 wherein the ferromagnetic or ferromagnetic layer also extends over regions not magnetic biased.

7. The marking device according to claim 5 wherein the antiferromagnetic layer is so assembled from super-imposed ferromagnetic or ferromagnetic and/or nonmagnetic partial layers that they couple in a nonparallel or antiparallel manner.

8. The marking device according to claim 5 wherein regions of the antiferromagnetic layer are built up so that they couple with the ferromagnetic or ferromagnetic layer in at least two different directions.

9. The marking device according to claim 5 wherein the layer system comprising the antiferromagnet layer and the ferromagnetic or ferromagnetic layer is covered with a protective layer.

10. The marking device according to claim 5 wherein the layer system comprising the antiferromagnetic layer and/or the ferromagnetic or ferromagnetic layer is disposed on a smooth or structured carrier consisting of nonmagnetic material.

11. The marking device according to claim 5 wherein the degree of bias is adjustable by disposition of an additional layer at least partly covering said layer system.

12. A method of reading a marking device according to claim 1 with the aid of a magnetic field sensor wherein the marking device is subject to at least two reading processes, wherein one reading process is carried out in a zero field and another reading process is carried out in an external magnetic field or wherein the reading processes are carried out in different external magnetic fields.

13. A marking device for the identification of an object and formed on the object, said marking device having laterally offset regions with different magnetic characteristics, the laterally offset regions being magnetic regions which are so magnetically biased or manufactured that hysteresis loops thereof are shifted differently to each other on a field strength axis (H).

* * * * *